Patented June 28, 1927.

1,633,997

UNITED STATES PATENT OFFICE.

PAUL NAWIASKY, OF LUDWIGSHAFEN-ON-THE-RHINE, KARL ZAHN, OF HOCHST-ON-THE-MAIN, AND KARL SAURWEIN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF VAT DYESTUFFS.

No Drawing. Application filed November 23, 1925, Serial No. 71,020, and in Germany December 13, 1924.

We have found that new valuable vat dyestuffs can be obtained by treating ethers of hydroxy-benzanthrones substituted by halogen in the Bz-1-position but with a free 2-position, with alkaline condensing agents. The new dyestuffs which are believed to be members of the isodibenzanthrone series, are distinguished by their very beautiful tints and by their good fastness.

The following example will serve to illustrate further how the invention may be carried out in practice, but the invention is not limited to this example. The parts are by weight.

*Example.*

7 parts of Bz-1-chlor-Bz-2-methoxy-benzanthrone corresponding to the formula

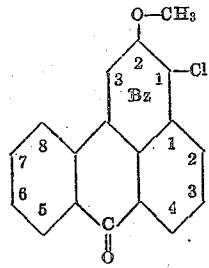

(obtained for example by treating Bz-2-methoxy-benzanthrone with sulfuryl chlorid in nitrobenzene solution or by methylating Bz-1-chlor-Bz-2-hydroxy-benzanthrone obtainable by chlorinating Bz-2-hydroxy-benzanthrone) are introduced into a melt prepared from 28 parts of caustic potash and 28 parts of alcohol, at 135 degrees to 140 degrees centigrade. The mixture is stirred for about an hour at 145 degrees to 150 degrees centigrade, thereupon diluted with water and boiled. The dyestuff is then precipitated by aerating, filtered off, washed until neutral and made into a paste.

The new dyestuff to which we attribute the formula (to which, however, we do not wish to bind ourselves)

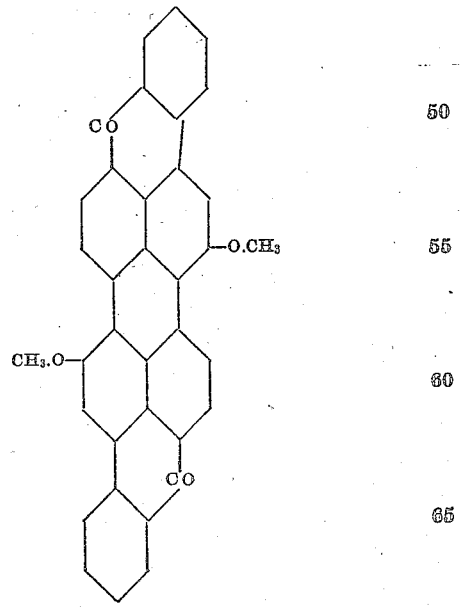

gives a pure blue vat from which cotton is dyed the same color. By the oxidizing action of the air, the color is changed to a bright greenish blue. The dyestuff dissolves in concentrated sulfuric acid, claret red. It can be purified by boiling with indifferent solvents for example dichlor-benzene, or by fractionally precipitating from sulfuric acid.

From other ethers of hydroxy-benzanthrones halogenated in the Bz-1-position and with a free 2-position, dyestuffs can be obtained in a similar manner.

We claim:

1. The process of manufacturing new vat dyestuffs which consists in acting on ethers of hydroxy-benzanthrones halogenated in the Bz-1-position and having a free 2-position with an alkaline condensing agent, 2. The process of manufacturing a new vat dyestuff which consists in acting on Bz-1-chlor-Bz-2-methoxy-benzanthrone with an alkaline condensing agent.

3. As a new article of manufacture a vat dyestuff which can be obtained by acting on Bz-1-chlor-Bz-2-methoxy-benzanthrone with an alkaline condensing agent and which dissolves in concentrated sulfuric acid with a claret red coloration and dyes cotton from a blue vat blue shades which by oxidation turn to a bright greenish blue.

In testimony whereof we have hereunto set our hands.

PAUL NAWIASKY.
KARL ZAHN.
KARL SAURWEIN.